United States Patent [19]
Hartman

[11] 3,877,295
[45] Apr. 15, 1975

[54] PLASTIC COATED BOTTLE TESTING SYSTEM

[75] Inventor: Curtis A. Hartman, Elmira, N.Y.

[73] Assignee: Dart Industries Inc., Los Angeles, Calif.

[22] Filed: Aug. 29, 1973

[21] Appl. No.: 392,802

Related U.S. Application Data
[63] Continuation-in-part of Ser. No. 232,384, March 7, 1972, abandoned.

[52] U.S. Cl. .................................................. 73/67.2
[51] Int. Cl. ........................ G01m 7/00; G01m 5/00
[58] Field of Search ............... 73/67, 67.1, 67.2, 69, 73/12

[56] References Cited
UNITED STATES PATENTS
2,635,746 4/1953 Gordon ........................... 73/67.2 X
3,438,493 4/1969 Goble ............................. 73/67.2 X
3,580,056 5/1971 Warner ............................. 73/67.2
3,623,358 11/1971 Sugimoto .......................... 73/67.2

FOREIGN PATENTS OR APPLICATIONS
136,086 11/1960 U.S.S.R. ............................ 73/67.2
156,338 11/1963 U.S.S.R. ............................ 73/67.2

Primary Examiner—James J. Gill
Attorney, Agent, or Firm—Kenneth J. Hovet; Leigh B. Taylor; Paul Wylie

[57] ABSTRACT

A bottle is struck by an impact mechanism. The sound of impact is detected and the sound decay characteristics are utilized to determine whether the bottle is solid and acceptable or whether it is cracked or broken and thereby rejected.

7 Claims, 6 Drawing Figures

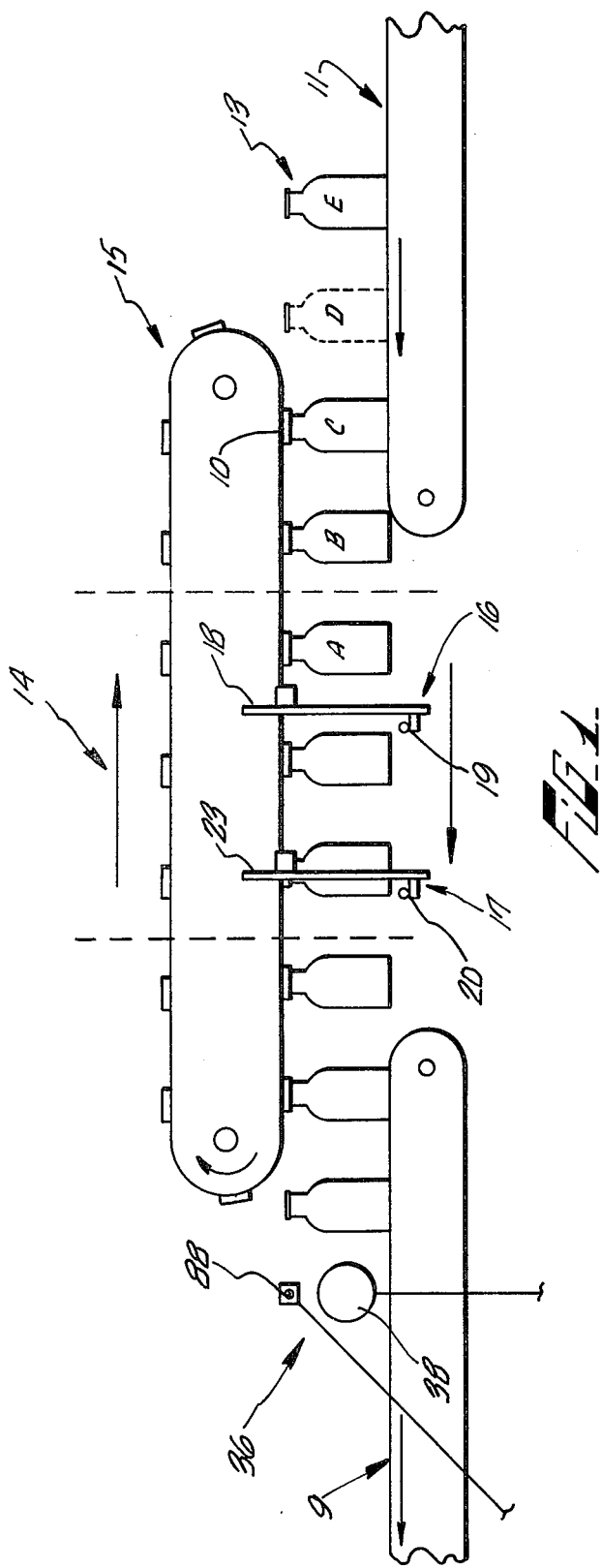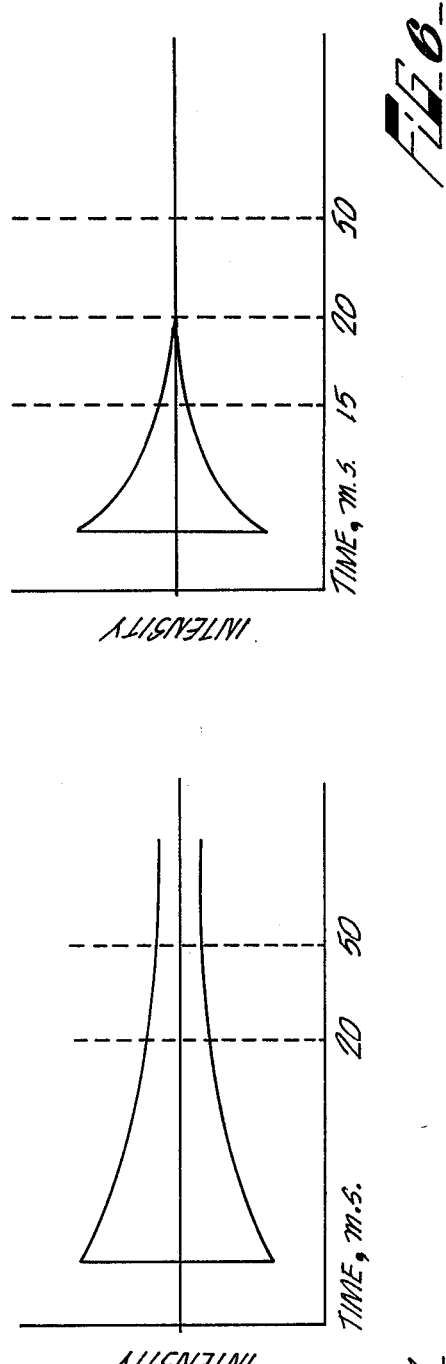

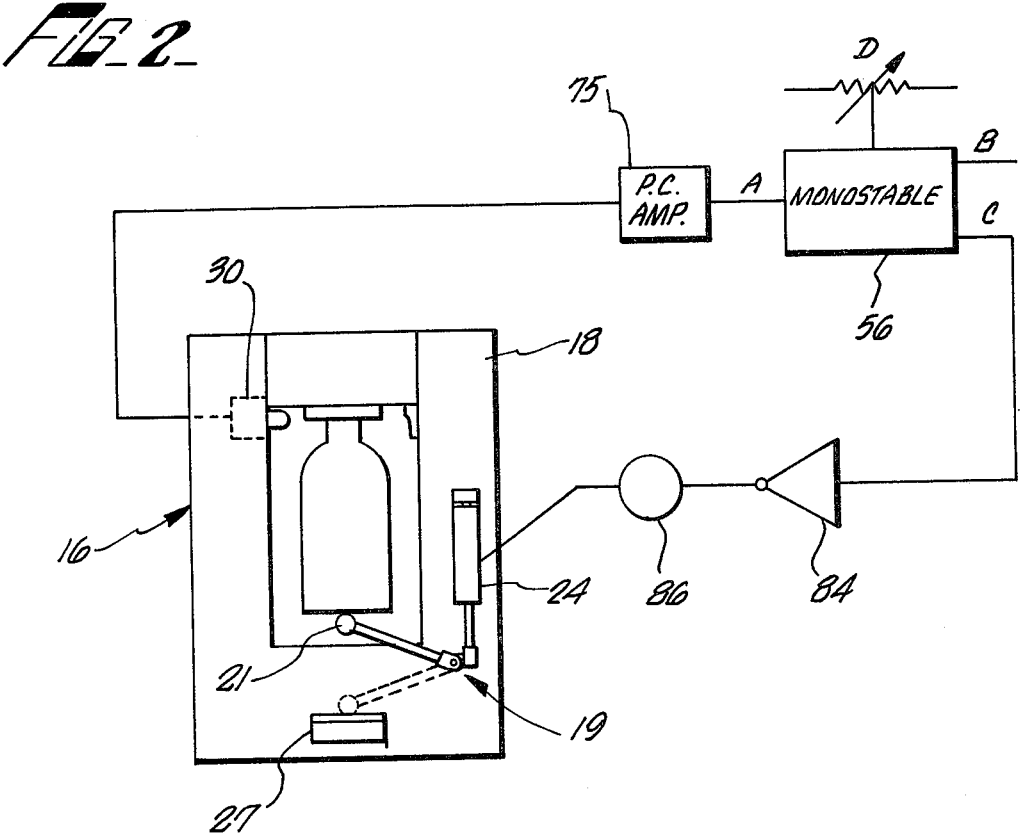
FIG_2_
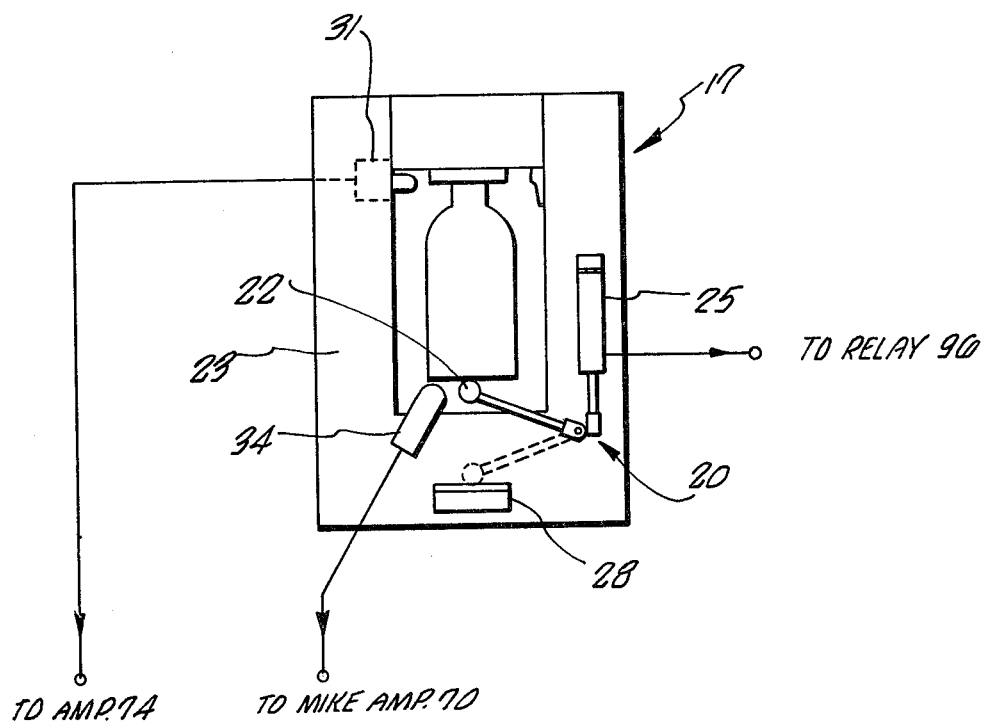
FIG_3_

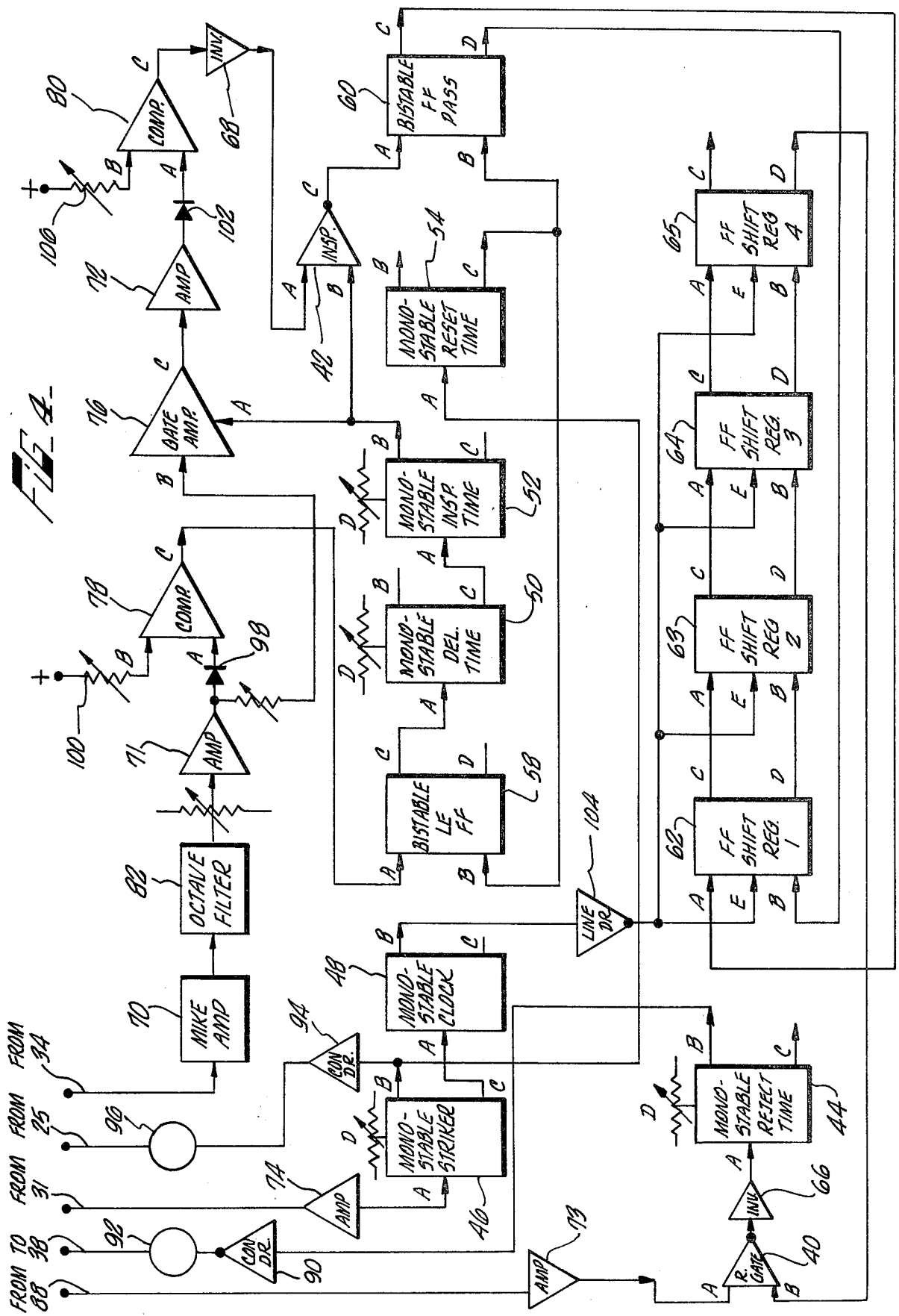

PLASTIC COATED BOTTLE TESTING SYSTEM

This is a continuation-in-part of application Ser. No. 232,384, filed Mar. 7, 1972 now abandoned.

BACKGROUND OF THE INVENTION

The present invention relates to a system for inspecting containers and, more particularly, to a system for detecting defects in frangible containers and rejecting those that are found to be defective.

DESCRIPTION OF THE PRIOR ART

The prior art is replete with all manner of glass bottle inspection systems including optical systems, gamma radiation devices, laser beams, weight and density apparatus, and sound wave systems. However, none of the systems or devices are suitable on an assembly line for detecting bottles that have been encased, coated and/or reinforced with a plastic covering. Such bottles are described in U.S. patent application Ser. No. 232,589, filed Mar. 7, 1972, and are generally considered safety bottles since they are highly resistant to breakage.

Conventional geometric audible oscillation or optical techniques for glass bottles are not suitable for plastic coated bottles because the coating has varying thickness and is frequently colored or it has printing on it. Furthermore, the coating stresses the glass in a manner to render unreliable any sound oscillations caused to emanate therefrom.

SUMMARY OF THE INVENTION

In accordance with the present invention, there is provided a system which reliably detects flaws in glass bottles. The system is based upon the fact that a solid bottle will exhibit an extended sound decay curve upon being struck by an impact mechanism. The invention further provides an integrated rejection means for removing defective bottles which is especially desirable on a continuously operating production line. The system comprises a conveying means to transfer and position the bottles within the impact zone, an impact means to strike the bottle and cause sound waves, an electro-acoustic means for receiving the sound waves and converting them to electrical impulses, a monitoring means to sense and respond to the character of the electrical impulses and rejection means for discarding defective bottles upon receipt of a signal from said monitoring means.

The invention is particularly suitable for detecting defects in frangible containers that are substantially covered with an insulative or protective material such as plastic, paper, rubber, cellulosic materials or the like. An external covering is preferred although containers covered on the inside of the container or both inside and outside and over different selected areas of the container are contemplated as within the scope of the present invention.

The invention further includes novel circuit arrangements to operate and control the testing system of the present invention. The unique circuitry includes means to select predetermined vibrational frequencies induced by impacting containers to be tested, means to compare the amplitude of the selected frequencies, and memory means to retain the results of comparison for subsequent rejection if the containers are found defective.

A method of operation is also disclosed whereby a frangible container is conveyed and positioned within an impact zone. The container is struck by an impact mechanism and the sound caused by said impact means is detected by electro-acoustic means. The electro-acoustic means converts the sound waves to electrical signals which are transmitted to monitoring means. The monitoring means senses the character of the electrical signal and compares it to a standard. If the container is defective, a signal is sent to the rejection means which acts to remove the bottle from the conveying means.

BRIEF DESCRIPTION OF THE DRAWINGS

FIG. 1 is a schematic illustration of an inspection system embodying the present invention.

FIG. 2 is a side elevation view of the pre-inspection striking assembly of the present invention.

FIG. 3 is a side elevation view of the inspection striking assembly of the present invention.

FIG. 4 is a detailed diagram of the circuit of the present invention.

FIG. 5 is exemplary of a sound decay graph showing the intensity of sound as a function of time for a solid uncracked plastic coated bottle.

FIG. 6 is exemplary of a sound decoy graph showing the intensity sound as a function of time for a broken or cracked plastic coated bottle.

DESCRIPTION OF THE PREFERRED EMBODIMENT

Referring now to FIG. 1, there is shown an inspection system embodying the concepts of the present invention. Conveying means 11 is shown transporting bottles 13 A–E to impact zone 14 (shown between the dotted lines in FIG. 1). The bottles may be coated, covered or shrouded with a plastic material. The conveying means may include any manner of feeder mechanisms, stacking and/or counting means and includes a conveying means 15 for transporting bottles 13 through the inspection system. The exact manner of transporting and presenting the bottles for inspection is merely a matter of choice and any system commonly used for conveying glass bottles such as belts, chains, paddles, vibration or helix means may be used. A screw feeder mechanism for separating the bottles from each other and an overhead conveying means including clamping chucks which grasp the bottle about the neck portion as disclosed in U.S. patent applications, Ser. Nos. 232,413 and 232,455, both filed on Mar. 7, 1972 and herein incorporated by reference, are especially suitable for moving the bottles through the system.

The function of the overhead conveyor is to convey the bottles in a predictable manner through an inspection area with said bottles confined only by the finish or opening so that they are free to vibrate at their natural resonant frequency unhampered by contact with other objects.

As bottles 13, which are designated 13A, B, C and D for purposes of later discussion, proceed through the impact zone 14, pass through openings provided in striking assemblies 16 and 17. The assemblies include mounting plates 18 and 23 to which are affixed impact means including striking devices 19 and 20. As shown more particularly in FIGS. 2 and 3, the striking devices include hammer-type mechanisms 21–22 which are operated pneumatically or electro mechanically by actuator means 24–25 respectively. Said means may be, for example, air cylinder or solenoid devices. The striking devices 21–22 are advantageously powered both upwardly for striking bottles and downwardly to rest upon snubbers 27–28. The sound produced by striking bottles 13 generally ranges between about 1000 to 15,000 cps. Advantageously, the snubbers are made of a resilient or vibration absorbent material such as rubber so as to absorb the natural vibrations of the striking devices. This reduces unwanted vibration as well as insures that the striking implement will be at rest prior to each blow.

Also included with the striking assemblies 16–17 are indexing photosensors 30–31 which emit a photobeam and determine the precise position of the bottles as they pass through the impact zone 14 of the system. It should be understood that other forms of indexing such as switches driven by chucks, gearing or other electro mechanical devices could serve in place of the described photosensors. Furthermore, said indexing photosensors can be a combination photosensor and light source used in conjunction with a reflective material, or a separate photosensor and light source mounted perpendicular to the travel of the overhead conveyor. Interruption of the described photosensor initiates the electrical sequence required to operate the striking devices for a time sufficient to cause the said hammer-like implement to impact any bottle approximately positioned within the impact zone.

It is to be noted that the process of producing plastic coated glass bottles such as that set forth in U.S. patent application, Ser. No. 232,589, filed Mar. 7, 1972, subjects the glass to large temperature gradients. Such temperature gradients tend to open small checks, cracks or other defects in the bottle which are difficult to visually observe due to the plastic coating. Also the coating tends to confine any broken glass in place further making it hard to detect. To obviate these difficulties the present invention provides at least one initial impact prior to an inspection impact to enlarge any cracks or similar defects. This first impact enhances the overall sensitivity of the test system. Although only one initial striker 21 or striker assembly 16 is described in this embodiment, a plurality of such assemblies or strikers could be used in series or for impacting other areas of the bottle simultaneously. It is desirable that the pre-inspection impacting of the bottle be done at a time out of phase with the inspection to prevent sould from the conditioning or pre-inspection impact from entering the inspection circuits during the inspection interval. In accordance with this requirement it is preferable that the striking assemblies be spaced at a midpoint between multiples of the bottle spacing.

Striker assembly 17 shown in FIG. 3 with the addition of electro-acoustic means 34, when interfaced with the circuitry to be described, performs the inspection function to determine whether a bottle struck by the striking device 20 should be rejected after a predetermined time when said bottle arrives at reject zone 36. Rejection means 38, such as, for example, a plunger, is activated when the bottle interrupts the photobeam from photosensor 31. It is to be understood that during the above-mentioned predetermined time interval, many additional bottles may have been struck requiring retention of information as to the quality of such bottles during the interim period. The circuitry senses the presence or absence of electrical signals which correspond to sound waves emitted from impacted bottles. As shown in FIG. 5, a solid bottle emits sound waves about greater than 30 percent of the original impact intensity existing 15 milliseconds or more beyond the time of impact. When a cracked or defective bottle is struck, the sound it emits corresponds to the intensity-time curves shown in FIG. 6. In this case, the sound intensity falls off rapidly and is less than about 25 percent of the original impact intensity at a point not more than about 15 milliseconds after impact.

Referring now more particularly to FIG. 4 of the drawings, there is shown integrated circuits for controlling the operation of the test system. Linear and digital devices are shown in block form. In discussing the circuitry, positive logic will be used throughout. Thus, 0 indicates a zero or low positive voltage, while a 1 is indicated by a high positive voltage near the supply voltage Vcc of the circuit. Reject gate 40 and Inspection gate 42 are two input nand gates. The nand definition states that no output or 0 is produced at C when $a$ and $b$ are high or 1. Reject monostable 44, striker monostable 46, clock monostable 48, delay time monostable 50, inspection monostable 52, reset monostable 54 and impact striker monostable 56 are timing devices which produce an output pulse or 1 on the B output when the input voltage A makes the transition from the low to the high level. The time duration or pulse output duration is a function of the values of resistance and capacity used in conjunction with each of the circuit devices. It is usually made adjustable to provide optimized timing for each style bottle being tested as well as providing the aforementioned 1 output during the timed period the complement output $c$ is also present. This will normally be the high or 1 output which drops to 0 during the timing period.

Bistable inspection trigger 58 and bistable pass 60 are flip-flop or toggle devices which change state with the application of pulse signals upon the proper inputs. A simple circuit to perform the required function can be assembled from two cross coupled nand gates. In FIG. 4, these devices are designated as latching devices in which the output 1 is present on C when the set input A goes low. It remains in this state even though such set input returns to its former high state and this must be done prior to operation in the other condition. The only way the output state of the latch can be changed is by a negative transition on the reset input B of the latch. Complementary outputs are available on the latch at D.

Another bistable circuit used in the present invention is in the shift registers 62, 63, 64 and 65. This circuit is classed as a clocked R-S flip flop. Here the output can be set or reset at A or B in a manner similar to the previously described device; however, the outputs of the device C and D will only change state upon the application of a timed clock pulse at E. The output state being determined by the logic signals which are present at the set and reset inputs at the end of the negative clock pulse or when the clock returns to its positive state.

Inverters 66 and 68 invert the signal 180° and produce a high output when the input is low. The linear devices used herein are amplifiers 70–75 which are used to amplify the low values of signals produced by the electro-acoustic means 34 or photosensors 30–31 to produce the greater signals required to operate the various logic devices. Gated amplifier 76 amplifies only during the time that a high 1 signal is present on the gate input 76A. At all other times no signal is passed through the device.

Comparators 78 and 80 are devices which produce a 0 output signal at C only when the signal at A exceeds the D.C. signal present on the B input. Octave filter 82 has an adjustable band pass characteristic to pass signals lying within the confines of one octave.

Returning now to a detailed description of the operation of the testing system, the bottles 13 traveling on inlet conveyor 11 are grasped by chuck means 10 such as that described in U.S. patent applications Ser. Nos. 232,413 and 232,455 filed Mar. 7, 1972. The chucks are connected to overhead conveyor 15 so that the bottles are suspended therefrom. As each of the chucks 10 pass through the photobeams from photosensors 30–31, a signal is produced which initiates the actions of the striking devices 19 and 20.

In the case of the pre-inspection impacting means shown in FIG. 2, the chuck 10 passes through the photobeam of photosensor 30 and goes to the dark condition whereby the output of the photocell amplifier 75 goes to the 0 or low condition. As the chuck passes through the beam and light is restored on the photocell the amp output returns to the 1 or high condition to trigger monostable 56. The complementary output C of monostable 56 operates the relay driver 84 which in turn drives relay 86 to energize the actuating means 24 and causes the hammer-type mechanism 21 to impact the bottle enlarging any cracks or defects which might exist therein.

All bottles passing through the overhead conveyor 15 are released on the take-away conveyor 9 by the opening of its retaining chuck. Adjacent to conveyor 9 is reject means 36 which may be an electrical solenoid or an electrically actuated air cylinder, the purpose of which is to remove all bottles passing such plunger in the absence of an electrical signal indicating that the bottle passing said plunger is acceptable and therefore should be allowed to pass. The presence of the passing bottles is determined by photobeam 88 which is interrupted by every bottle passing through it.

As photobeam 88 is interrupted and its photocell goes dark, the output of amplifier 73 goes high or 1 placing a 1 on input A of nand gate 40 (as the input B of said gate is normally 1 in the absence of a pass signal). The output at 40C goes to 0 which is inverted to a 1 by inverter 66. This positive transition is placed on the A input of the reject monostable 44 causing the monostable to produce a timed output pulse at output B which in turn operates relay driver 90 to drive relay 92. Closure of contacts on relay 92 operate the reject plunger 38 which, for example, may be a solenoid operated air driven reject plunger. The plunger should be energized only for an adequate period of time to push a bottle from the conveyor. This time is determined by the values of resistance and capacity in the monostable timing circuit line and is represented graphically in FIG. 4 by monostable 44D. From the above, it can be seen that all bottles passing photobeam 88 will be rejected (pushed from the conveyor) except during the presence of a 0 or low voltage at input B of nand gate 40.

Returning to the passage of the bottles along the overhead conveyor 15, it will be assumed that bottle 13 has been impacted by hammer mechanism 21 and is approaching photosensor 31 as shown in FIG. 3. As the chuck 10 interrupts said light beam, the photocell goes dark causing the amplifier 74 output to go to 0 as the opaque chuck passes through the beam. As light is again restored on said photocell the output of amplifier 74 returns to the high 1 condition. Since the output of amplifier 74 is also impressed on the input A of striker monostable 46 the transition serves to trigger said monostable resulting in a rising pulse of a timed duration to appear on output B of said monostable. This pulse is used to control driver 94 and relay 96 to activate the striking device 20 in the same manner as that previously described for the pre-inspection striking device 19. It is important that the striking implement 22 be retracted immediately after the impact as prolonged contact with the bottle tends to dampen the vibrations in the bottle as well as impede the progress of the bottle through the inspection zone 14.

A portion of the sound energy produced by striking the bottom of the bottle is detected by electro-acoustic means 34, such as, for example a microphone, and amplified by amplifier 70. The output of amplifier 70 is impressed on octave filter 82 which passes the frequencies near the resonant frequency of the bottle while attenuating all other frequencies including most of the ambient noise present in a factory. For large plastic coated bottles, such as the 32 oz. size, the preferred octave listening range is about 6000–12000 cps. For extra large bottles, such as, for example, a 64 oz. size, the optimum sound detection range is 3000–6000 cps. The use of octave ranges for sound detection serves to minimize ambient noise and produce a better signal for electronic detection.

The output of filter 82 is further amplified by amp 71 and rectified by diode 98 to pass only the positive portion of the sound envelope and impress it on input A of comparitor 78. In the comparitor circuit, the positive peaks of the input are compared with the D.C. set point on input B which may be adjusted by resistance 100. When the signal voltage at A exceeds the set voltage at B, the output at C swings to the low or 0 state. The output C is comprised of a series of short pulses starting with the leading edge of the sound envelope and continuing until the impressed voltage drops below the set point.

The purpose of comparators 78 is to establish the instant of impact for activation of the inspection cycle. As the output of the comparitor is impressed on A input of bistable 58 it causes output C to go to the high 1 state. Since the input A of monostable 50 is connected to the C output of bistable 58, the monostable 50 is triggered to produce a timed output pulse on complementary output C causing this output to go low or 0 for a timed period dependent on the resistance and capacity in the duration line 50D. The purpose of this delay time is to allow the sound produced in a cracked bottle to dissipate to a predetermined low value. In the system of the present invention, this time is usually of 10–50 milliseconds duration. At the end of the delay time, output C of monostable 50 returns to its normal high 1 timed pulse on its output 52-B for a duration determined by the resistance and capacitors present in line 52D. The purpose of this time is to determine whether, after the delay time offered by monostable 50 an appreciable sound level still persists (ringing) as would be the case with an uncracked bottle.

The time duration of monostable 52 is therefore used to interrogate the sound envelope produced by the striking of the bottle. This is accomplished by placing the output B of monostable 52 on the gate input 76A of gated amplifier 76. As the sound envelope or microphone signal is impressed on input B, the output 76C will consist of the sound only during the time that monostable 52 is triggered "on." The output of gated amplifier 76 is further amplified by amplifier 72 and rectified by diode 102. The positive going pulse appearing on input A is compared with the D.C. voltage present on input B which in turn is determined by resistance 106. If an appreciable signal is present on input A exceeding the D.C. level on B, the output of C goes to the 0 low level. This 0 level is inverted by inverter 68 with the result that a high or 1 appears on input A of nand gate 42. Input B of nand gate 42 is activated simultaneously with the gated amplifier 76 so that during the interrogation time, a signal 1 is present on nand gate 42. It is therefore apparent that when a signal is present on the output of the comparator 80 (as would be true with an uncracked bottle), a low signal appears on output C of nand gate 42. As this output appears on input A of bistable 60 this device will change state with a high or 1 appearing on output C.

In operation, bistable 60 will change state only if a good bottle has been struck indicating that such bottle should pass the rejection station. As the rejection station is physically displaced downstream from the inspected bottle, it is clear that means must be incorporated to retain the information that the bottle is intact and should not be rejected. With the present invention, this information is retained in a shift memory system composed of clocked bistables 62, 63, 64 and 65. As previously described, this device will only change output state upon demand from a clocked pulse on input E. Such a clocked pulse is provided by monostable 48 which is triggered at the end of the striker pulse by complementary output 46C. Monostable 46 produces a pulse for every chuck interrupting the photobeam from photosensor 31. This pulse starts at an approximate time when the bottle has been struck and continues until after the end of the interrogation time. The output 48B is inverted by driver 104 which is provided to drive a plurality of bistable E inputs. The E input of all shift registers go low 0 for the clock pulse period and the output of all such shift registers assume the state of the A and B inputs on the transition from the low to the normal high state.

As previously stated, the bistable 60 is in the "on" condition indicating an uncracked bottle with C output high 1 and D output low 0. As the device is connected to the clocked bistable 62 the A input of this device is high 1 and the B input is low 0 assuming the clock pulse on input E to the low, which it would be from the approximate time of striking until after the end of interrogation time. At the end of the clock pulse duration the 62 E input returns to its normal high input causing output 62 C to go to high 1 and complementary output D to go to low. The device will remain in this condition indefinitely in the absence of another clock pulse — as might be the case if the machine were stopped and the chucks were not intercepting the photobeam from photosensor 31. If the conveyor 15 was running, however, the next chuck containing bottle 13B would interrupt sensor 31 producing the signal to trigger monostable 46 to activate the striking device 20 in the same manner as in the previous example.

One additional function that must be performed is the resetting of bistables 58 and 60. These must be reset to the off condition in order that subsequent bottles may be inspected. It is desirable that this reset function be delayed until just prior to the inspection of subsequent bottles as it serves to prevent any false triggering of the inspection device from extraneous noise or other pickup of the microphone. The resetting is accomplished by output B of monostable 46 which performs the dual function of activating the striking device and triggering reset monostable 54. This time which can be of a short fixed duration of about 10 milliseconds produces a low 0 pulse on the C input to reset bistables 58 and 60 on their B inputs.

As the time required to reset the bistables is a short 10 milliseconds or less compared to the time necessary to operate the striking device (100 milliseconds or more), bistables 58 and 60 are reset well in advance of the next impact of the striker. In the instance where bottle 13B is cracked, the sound envelope produced by the hammer or striker 22 will have a fast decay rate. Such sound is detected by microphone 34, amplified by 70, filtered by 82, amplified by 71, rectified by 98, compared to reference 100B to produce output at 78C, thus causing bistable 58 to change state. As bistable 58 changes state, monostable 50 is activated for a period during which the sound envelope has decayed to a very low value. At the conclusion of that time, the interrogation of the envelope is performed by monostable 52 gating on the gate amp 76. As the sound envelope has dissipated to a low value prior to the turning on the gate, there is insufficient signal present at comparator 80A input to overcome the reference voltage 106 appearing on 80B. There is, therefore, no change in the normal 1 voltage appearing at comparator 80C output.

As inverter 68 output remains normal at 0, nand gate 42 in the case of a cracked bottle has input A low 0 and input B "high" which does not satisfy the nand definition and does not change state. As 42C remains high, bistable 60 does not change state which does not satisfy the pass condition. At the end of the clock pulse, input A of clocked bistable 62 is low while input B is high. This causes the device to change state due to the interconnection of C and D of bistable 62 to A and B of bistable 63. The output of shift register 1 shown in FIG. 4 is thereby transferred into shift register 2. At this time the first shift register shows a 0 at output 62 C due to the cracked condition of bottle 13B and a 1 at the output of 63C due to the uncracked bottle 13A.

In the case where the bottle (13A) is very badly cracked and producing very little sound there is not enough signal to activate comparator 78 and the inspection circuits are not activated by bistable 58. As bistable 60 does not change state, the "off" condition is present at the input to clocked bistable 62 and another 0 is clocked into shift register (SR) 1 while output 67C remains 0. At this time SR-1 is 0 for bottle 13C and SR-2 is 0 for bottle 13B and SR-3 is 1 due to bottle 13A which was intact. In the instance where the bottle (13D) is missing as shown by phantom lines in FIG. 1, the chuck will still activate photosensor 31 to activate the striker device 20. However, as there is not a bottle in the chuck, the striker cannot impact it and no sound is produced to activate the inspection circuitry. As the bistable 60 has not been activated, another 0 is clocked into the shift register. As the 1 from the good bottle 13A is now present at SR-4, the complementary 0 is impressed on nand gate 40 which becomes de-activated thereby allowing bottle 13A to pass without being rejected. The reject means 38 and photobeam 88 should be positioned such that bottles intercept photobeam 88 approximately midway between the clock pulses in time.

Returning to the progression of the bottles through the machine when 13E is impacted, the 0 of cracked bottle 13B is entered into SR-4 and the nand gate input B returns to the normal high position rejecting bottle 13B as it arrives at the reject station as does bottle 13C. In the case of bottle 13D, which is missing, the 0 is entered in the SR-4 but since the bottle does not exist, it cannot activate photosensor 31.

While bottles are clamped by the chucks in the system the information retained in the shift register can be considered to be static with information retained in the machine indefinitely. However, when the bottles are released on the take-away conveyor 9, this identity can be lost. It is therefore desirable to locate the reject device as close as feasible to the point at which they are released on conveyor 9.

What is claimed is:

1. An inspection system for frangible bottles comprising:
    conditioning means for striking frangible bottles to enlarge preexisting defects;
    impact means for striking said frangible bottles and causing sound wave emissions;
    electro-acoustic means for receiving said sound waves and converting them to electrical impulses;
    monitoring means for sensing the character of said electrical impulses and causing an activation signal in response to a particular predetermined electrical impulse; and,
    rejection means for discarding defective bottles upon receipt of said activation signal from said monitoring means.

2. The inspection system of claim 1, including conveying means to transfer and position said bottles within impact and rejection zones.

3. A system for continuously and sequentially detecting plastic coated bottles, comprising:
    means to transport a plastic coated bottle through a conditioning zone, an impact zone and a rejection zone;
    means to condition said bottle in said conditioning zone to enhance the sensitivity of the detecting system;
    means to contact said bottle within said impact zone and cause a substantially detectable sound wave frequency for a time of less than about 15 milliseconds duration after said contact;
    means to receive said sound wave frequency and convert it into a corresponding electrical current;
    means to selectively sense said current and initiate an electrical signal thereby; and,
    means operable to reject said defective bottle from said rejection zone in response to said signal.

4. A method of testing a plastic coated bottle for the presence of imperfections comprising:
    conditioning said bottle to enlarge said imperfections;
    placing, said conditioned bottle between an impacting means and a sound receiving device;
    striking said bottle with said impacting means in a manner to cause a sound emission;
    monitoring said emissions with said sound receiving device;
    determining the duration and intensity of said emission; and,
    rejecting said bottle when the intensity becomes substantially undetectable in less than 15 milliseconds after striking said bottle.

5. The method of claim 4 wherein a plurality of bottles are individually and sequentially tested on a continuous basis and including conveying means to move said bottles.

6. The method of claim 4, wherein said sound emission has a frequency within the range of 1000 to 15,000 cps.

7. A container testing system comprising:
    a striking assembly for impacting a container including a pre-inspection impacting means to condition said container and an inspection impacting means for inducing vibrations in said container to determine the integrity thereof;
    means to detect said vibrations including filter means to select predetermined vibrational frequencies;
    means for comparing the amplitude of said vibrational frequencies with a known standard;
    memory means to retain the results of said comparing means for each container impacted; and,
    means to reject defective containers.

* * * * *

UNITED STATES PATENT OFFICE
CERTIFICATE OF CORRECTION

Patent No. 3,877,295          Dated April 15, 1975

Inventor(s)  C.A. Hartman

It is certified that error appears in the above-identified patent and that said Letters Patent are hereby corrected as shown below:

In Fig. 3 of the drawings, the arrow pointing to "To Relay 96" should be reversed and "To" should be replaced with ---From---. In Fig. 4 lower left-hand corner change

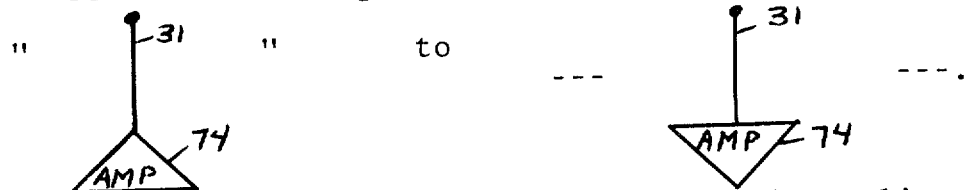

Column 3, line 47, change "sould" to ---sound---; line 61 change "31" to ---88---. Column 4, lines 30 and 31 replace "tested as well as providing" with ---tested. It also provides---. Column 6, line 59 after "1" insert ---condition, causing monostable 52 to operate placing a high 1---. Column 7, line 36 change "Monostable 46" to ---Monostable 48---; line 52 change "the low" to ---be low---. Column 8, line 48, replace "13A" to ---13C---. Claim 3, line 2 after "ing" insert ---and rejecting defective---.

Signed and Sealed this second Day of December 1975

[SEAL]

Attest:

RUTH C. MASON  
Attesting Officer

C. MARSHALL DANN  
Commissioner of Patents and Trademarks